(12) United States Patent
Hosokawa et al.

(10) Patent No.: US 10,486,680 B2
(45) Date of Patent: Nov. 26, 2019

(54) HYBRID VEHICLE

(71) Applicant: TOYOTA JIDOSHA KABUSHIKI KAISHA, Toyota-shi, Aichi-ken (JP)

(72) Inventors: Yohei Hosokawa, Susono (JP);
Masakazu Tabata, Susono (JP);
Naruto Yamane, Susono (JP);
Tatsuhiro Hashida, Suntou-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 184 days.

(21) Appl. No.: 15/837,092

(22) Filed: Dec. 11, 2017

(65) Prior Publication Data
US 2018/0215372 A1    Aug. 2, 2018

(30) Foreign Application Priority Data

Feb. 2, 2017    (JP) .................................. 2017-017824

(51) Int. Cl.
*B60W 20/00*   (2016.01)
*B60K 6/24*    (2007.10)
(Continued)

(52) U.S. Cl.
CPC .............. *B60W 20/00* (2013.01); *B60K 6/24* (2013.01); *B60K 6/26* (2013.01); *B60K 6/445* (2013.01);
(Continued)

(58) Field of Classification Search
CPC ... B60K 6/26; B60K 6/48; B60K 1/02; B60K 6/442; B60K 6/46; B60K 6/485;
(Continued)

(56) References Cited

U.S. PATENT DOCUMENTS

2001/0039230 A1*  11/2001  Severinsky ............ B60H 1/004
                                                  477/3
2006/0030450 A1*  2/2006  Kyle ....................... B60K 6/26
                                                  477/3

(Continued)

FOREIGN PATENT DOCUMENTS

JP    2004-229408 A    8/2004
JP    2004270602 A    9/2004
(Continued)

*Primary Examiner* — Behrang Badii
(74) *Attorney, Agent, or Firm* — Sughrue Mion, PLLC

(57) ABSTRACT

The energization control apparatus can select a supercharging mode in which the energization control apparatus controls energization to an electric compressor so as to rotate the electric compressor to supercharge an intake air and an electric power consumption mode in which the energization control apparatus controls the energization to the electric compressor so as to deteriorate efficiency of a motor of the electric compressor than the supercharging mode to increase electric power consumption of the electric compressor. The energization control apparatus supplies regenerated electric power to the electric compressor and control the energization to the electric compressor with the electric power consumption mode when regenerative braking is performed by a generator and regenerated electric power for obtaining demand regenerative braking force is more than an input limiting level of a battery.

5 Claims, 8 Drawing Sheets

(51) Int. Cl.
    *B60K 6/26*     (2007.10)
    *F02B 39/10*     (2006.01)
    *B60K 6/445*     (2007.10)
    *B60W 10/08*     (2006.01)
    *B60W 10/30*     (2006.01)
    *B60W 30/18*     (2012.01)
    *B60W 20/14*     (2016.01)
    *B60L 50/16*     (2019.01)
    *B23P 23/00*     (2006.01)
    *F02M 35/10*     (2006.01)

(52) U.S. Cl.
    CPC ............ *B60W 10/08* (2013.01); *B60W 10/30* (2013.01); *B60W 20/14* (2016.01); *B60W 30/18127* (2013.01); *F02B 39/10* (2013.01); *B23P 23/00* (2013.01); *B60L 50/16* (2019.02); *B60Y 2200/92* (2013.01); *B60Y 2300/18125* (2013.01); *B60Y 2400/435* (2013.01); *F02M 35/10157* (2013.01); *Y10S 903/905* (2013.01); *Y10S 903/906* (2013.01)

(58) Field of Classification Search
    CPC .......... B60K 6/547; B60K 6/365; B60K 6/24; B60K 6/445; B60K 6/22; B60L 1/00; B60L 15/2009; B60L 7/16; B60L 15/2045; B60L 7/18; B60L 7/26; B60L 50/61; B60L 50/16; B60L 53/00; B60L 53/20; B60L 58/10; B60L 58/12; B60H 1/004; B60H 1/3222; B60W 20/00; B60W 10/06; B60W 10/08; B60W 10/18; B60W 10/26; B60W 20/30; B60W 20/15; B60W 20/14; B60W 10/30; B60W 30/18127; B60W 20/10; F01N 3/2013; F02B 37/00; F02B 37/16; F02B 37/18; F02B 39/10; F02D 41/0007; F02M 35/10163; H01M 10/4207; B60Y 2200/92; B60Y 2300/18125; B60Y 2400/435; Y10S 903/905; Y10S 903/906; B60T 8/172; B60T 7/06; B60T 11/18; B60T 8/17
See application file for complete search history.

(56) References Cited

U.S. PATENT DOCUMENTS

2010/0044129 A1*   2/2010   Kyle ..................... B60K 6/26
                                                180/65.25
2010/0263640 A1*  10/2010   Armiroli ................ B60L 1/00
                                                123/565

FOREIGN PATENT DOCUMENTS

| JP | 2006070791 A | 3/2006 |
|---|---|---|
| JP | 2009-261200 A | 11/2009 |
| JP | 2010195081 A | 9/2010 |
| JP | 2010-268639 A | 11/2010 |
| JP | 2016-107803 A | 6/2016 |

* cited by examiner

HYBRID VEHICLE

CROSS-REFERENCE TO RELATED APPLICATION

This application is based on and claims the benefit of Japanese Patent Application No. 2017-017824, filed on Feb. 2, 2017, which is incorporated by reference herein in its entirety.

BACKGROUND

Field

The present disclosure relates to a hybrid vehicle, and more particularly, to a hybrid vehicle performing regenerative braking using a generator.

Background Art

JP2016-107803A discloses a hybrid vehicle that performs regenerative braking using a generator at the time of deceleration, and switches a supply destination of electric power regenerated in a process to obtain regenerative braking force appropriately between a battery and a plurality of accessories. Examples of the accessories include a compressor, an electric heater of an air conditioning equipment and a radiator fan. The hybrid vehicle disclosed in JP2016-107803A, when there is a constraint on the regenerated electric power that the battery can accept, has the accessories consume the regenerated electric power that the battery cannot accept.

However, on the electric power that the accessories can consume, there is a constraint depending on kinds of the accessories. For example, the electric power that is put into the compressor and the electric heater of the air conditioning equipment gives an influence on comfort in a vehicle compartment. Also, the electric power that is put into the radiator fan gives an influence on cooling performance of the internal combustion engine. Thus, the hybrid vehicle disclosed in JP2016-107803A, when there is a constraint on the regenerated electric power that the battery can accept, may not stably obtain the regenerative braking force to be required because of the insufficiency of the regenerated electric power that the accessories can consume.

Note that, in addition to the above described patent literature, JP 2009-261200A may be mentioned as an example of literature describing the state-of-the-art at the time of filing the present application.

SUMMARY

The present disclosure is made in the light of the problem as described above, and has an object to provide a hybrid vehicle that can obtain regenerative braking force to be required even when there is a constraint on regenerated electric power that a battery can accept.

A hybrid vehicle according to the present disclosure comprises at least an internal combustion engine, an electric compressor, a generator, a battery and an energization control apparatus. The internal combustion engine is coupled to a wheel via a power transmission system. The electric compressor is provided on an intake passage of the internal combustion engine and is driven by a motor. The generator is coupled to the wheel via the power transmission system and is designed to be capable of inputting regenerative braking force obtained by electric power regeneration to the power transmission system. The battery stores electric power regenerated by the generator. The energization control apparatus controls energization to the electric compressor. The electric compressor is supplied electric power to from a battery. This battery may be the same battery as the battery storing regenerated electric power, or may be another battery. The regenerated electric power that is regenerated by the generator may be supplied to the electric compressor.

The energization control apparatus is configured to be capable of selecting modes, that is, a supercharging mode and an electric power consumption mode. The supercharging mode is a control mode in which the energization control apparatus controls the energization to the electric compressor so as to rotate the electric compressor to supercharge an intake air. The electric power consumption mode is a control mode in which the energization control apparatus controls the energization to the electric compressor so as to deteriorate efficiency of the motor than the supercharging mode to increase electric power consumption of the electric compressor. The energization control apparatus is configured to supply the regenerated electric power to the electric compressor and control the energization to the electric compressor with the electric power consumption mode when regenerative braking is performed by using the generator and the regenerated electric power for obtaining demand regenerative braking force is more than an input limiting level of the battery.

As described above, the hybrid vehicle according to the present disclosure comprises the electric compressor supercharging air inhaled into the internal combustion engine. According to the electric compressor, supercharging can be performed with arbitrary supercharging pressure and can be performed at an arbitrary timing, by controlling electric power supply from the battery. Furthermore, the electric compressor can be also used for intentional electric power consumption other than the supercharging that is the original application. This is the electric power consumption mode that is prepared separately from the supercharging mode. In the electric power consumption mode, by deteriorating the efficiency of the motor than the supercharging mode and suppressing the rotation of the electric compressor, electric power is consumed without supercharging intake air. The electric power to be supplied in the electric power consumption mode is consumed as heat.

When the regenerative braking is performed by the generator, it is necessary to consume the regenerated electric power more than the input limiting level of the battery by using some kind of methods, in order to obtain the regenerative braking force to be required without depending on the magnitude of the input limiting level of the battery. According to the hybrid vehicle according to the present disclosure, the regenerated electric power more than the input limiting level of the battery can be consumed, by supplying the regenerated electric power to the electric compressor, and controlling the energization to the electric compressor with the electric power consumption mode. Thus, according to this hybrid vehicle according to the present disclosure, it is possible to obtain the regenerative braking force to be required even when there is a constraint on the regenerated electric power that the battery can accept.

According to an embodiment of the electric compressor, the electric compressor comprises an inverter that converts DC electric power into AC electric power and supplies it to the motor. In this embodiment, the energization control apparatus may be configured to generate command values of a two phase current that is a current flowing in the motor indicated with d-q coordinates defined by a d-axis and a q-axis, and determine a control signal to be supplied to the inverter based on the command values of the two phase current. Further, the energization control apparatus in the electric power consumption mode may generate the command values of the two phase current so as to bring a current phase angle on the d-q coordinates close to 90-degree angle than a current phase angle in the supercharging mode. Bringing the current phase angle close to 90-degree angle corresponds to deteriorating efficiency of conversion from electric power to torque. That is, in the electric power consumption mode, electric power consumption can be promoted while suppressing the torque of the motor by deteriorate the efficiency of the motor than the supercharging mode.

Because the rotation speed of the motor is generally proportional to the torque, if the electric power consumption and the rotation speed of the electric compressor are fixed, the efficiency of the motor is fixed, and the current phase angle is fixed. Thus, when an upper limiting rotation speed of the motor is fixed beforehand, a lower limit angle of the current phase angle is fixed based on a demand value of the electric power consumption and the upper limiting rotation speed. To keep the rotation speed of the motor from exceeding the upper limiting rotation speed, the energization control apparatus in the electric power consumption mode may generate the command values of the two phase current so as to keep the current phase angle within a range from the lower limit angle to 90-degree angle.

When the rotation speed of the motor is excessively low, heavy-current continues flowing into a particular switching element of the inverter, and thereby the inverter might be overheated and damaged. Thus, when the rotation speed of the motor is low, the energization to the electric compressor may be controlled to raise the rotation speed. Raising the rotation speed of the motor can be achieved by making the current phase angle small to improve the conversion efficiency from electric power to torque. Specifically, the command values of the two phase current may be generated so that the current phase angle does not exceed an upper limit angle. The upper limit angle of the current phase angle is set based on the electric power consumption demanded by the electric compressor and the rotation speed of the motor, and is lowered as the rotation speed of the motor is low. To keep the rotation speed of the motor within an appropriate range, the energization control apparatus in the electric power consumption mode may generate the command values of the two phase current so as to keep the current phase angle within a range from the lower limit angle to the upper limit angle.

Further, the energization control apparatus in the electric power consumption mode may set an upper limit level of the electric power consumption of the electric compressor according to the rotation speed of the motor, and may decrease the upper limit level of the electric power consumption as the rotation speed of the motor is low. When the rotation speed of the motor is low, a time period when current flows into a particular switching element of the inverter becomes long. However, an amount of current flowing into the particular switching element can be suppressed by decreasing the upper limit level of the electric power consumption. That is, this configuration can prevent damage of the inverter caused by heavy-current continuing flowing into the particular switching element of the inverter.

As described above, according to the hybrid vehicle according to the present disclosure, braking force to be required can be obtained even when there is a constraint on the regenerated electric power that the battery can accept.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Further, structures that are described in the embodiment shown as follows are not always indispensable to the disclosure unless specially explicitly shown otherwise, or unless the disclosure is explicitly specified by the structures theoretically.

Figure 1:
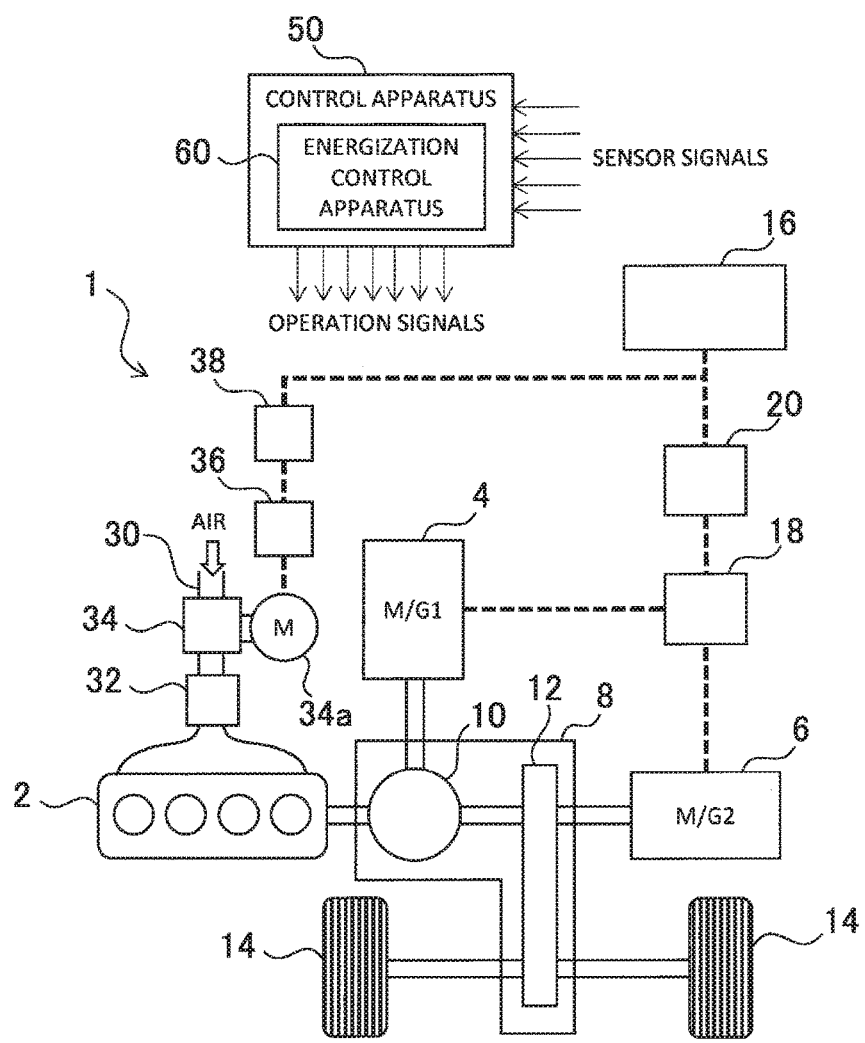
FIG. 1 is a view illustrating a configuration of a hybrid vehicle according to an embodiment.

FIG. 1 is a view illustrating a configuration of a hybrid vehicle according to the present embodiment. As shown in FIG. 1, the hybrid vehicle 1 comprises an engine 2 as one power apparatus to drive wheels 14. The engine 2 is an internal combustion engine outputting power by combustion of hydrocarbon-based fuel such as gasoline, light diesel oil, and the like. The engine 2 comprises an intake system, an exhaust system, a fuel injection system, an ignition system, a cooling system, and the like. An electric compressor 34 driven by a motor 34a is installed in an air intake passage 30 constituting the intake system. A throttle 32 to adjust an intake air amount is installed downstream of the electric compressor 34 in air intake passage 30.

The hybrid vehicle 1 comprises a first motor generator 4 and a second motor generator 6 that are power-generatable motors as the other power apparatuses to drive the wheels 14. The first motor generator 4 and the second motor generator 6 are alternating current synchronous type generator motors that have a function as a motor converting supplied electric power into torque and a function as a generator converting input mechanical power into electric power. The first motor generator 4 is operated as a generator mainly. The second motor generator 6 is operated as a motor mainly.

The engine 2, the first motor generator 4 and the second motor generator 6 are coupled to the wheels 14 via a power transmission system 8. The power transmission system 8 comprises a power distribution mechanism 10 and a reduction mechanism 12. For example, the power distribution mechanism 10 is a planetary gear unit. The power distribution mechanism 10 divides torque outputted by the engine 2 into the first motor generator 4 and the wheels 14. The torque outputted by the engine 2 or the torque outputted by the second motor generator 6 is transmitted to the wheels 14 through the reduction mechanism 12.

The first motor generator 4 regenerates electric power by using the torque supplied through the power distribution mechanism 10. When electric power regeneration is performed by the first motor generator 4 in the condition where torque is not outputted by the engine 2 and the second motor generator 6, braking force is transmitted to the wheels 14 through the power transmission system 8, and the hybrid vehicle 1 slows down. That is, the hybrid vehicle 1 can perform regenerative braking by use of the first motor generator 4.

The first motor generator 4 and the second motor generator 6 transmit and receive electric power to/from a battery 16 through an inverter 18 and a converter 20. The inverter 18 is designed to have any one of the first motor generator 4 and the second motor generator 6 consume electric power generated by the other of them. The inverter 18 converts electric power stored in the battery 16 into alternating current from direct current and supplies it to the second motor generator 6. Also, the inverter 18 converts electric power generated by the first motor generator 4 into direct current from alternating current and charges it into the battery 16. Therefore, the battery 16 is charged and discharged with extra/deficient electric power of the first motor generator 4 and the second motor generator 6.

The motor 34a of the electric compressor 34 is a three-phase AC motor. The motor 34a is supplied electric power to from the battery 16 through a converter 38 and an inverter 36. The converter 38 adjusts voltage. The inverter 36 converts DC power into AC power and supplies AC power to the motor 34a. Also, the motor 34a can be supplied electric power to from the first motor generator 4 and the second motor generator 6 through the inverter 18, the converter 20, the converter 38 and the inverter 36. For example, when the regenerative braking is performed by the first motor generator 4, part or all of electric power regenerated by the first motor generator 4 can be supplied to the motor 34a.

The hybrid vehicle 1 comprises a control apparatus 50 that controls operation of the hybrid vehicle 1 by controlling operation of the engine 2, the first motor generator 4, the second motor generator 6, the power distribution mechanism 10, and the like. The control apparatus 50 is an ECU (Electronic Control Unit) having at least one processor and at least one memory. Various programs and various data including maps for controlling operation of the hybrid vehicle 1 are stored in the memory. When programs stored in the memory are executed by the processor, various functions are implemented to the control apparatus 50. Note that the control apparatus 50 may consists of a plurality of ECUs.

The control device 50 performs control of the engine 2 including intake air amount control, fuel injection control, ignition timing control, and boost control. Also, the control device 50 performs regenerative control to operate the first motor generator 4 or the second motor generator 6 as a generator and power-run control to operate the first motor generator 4 or the second motor generator 6 as a motor. Specifically, the control to the first motor generator 4 and the second motor generator 6 is performed via the inverter 18. Also, the control device 50 acquires information such as the voltage of the battery 16 and watches SOC (State of Charge) of the battery 16.

Furthermore, the control device 50 also controls the motor 34a of the electric compressor 34. The control device 50 comprises an energization control apparatus 60 controlling energization to the motor 34a of the electric compressor 34. The energization control apparatus 60 consists of a processor and a program executed by the processor. However, the energization control apparatus 60 may be constructed from one ECU. Hereinafter, the configuration of the energization control apparatus 60 will be described by using FIG. 2.

Figure 2:
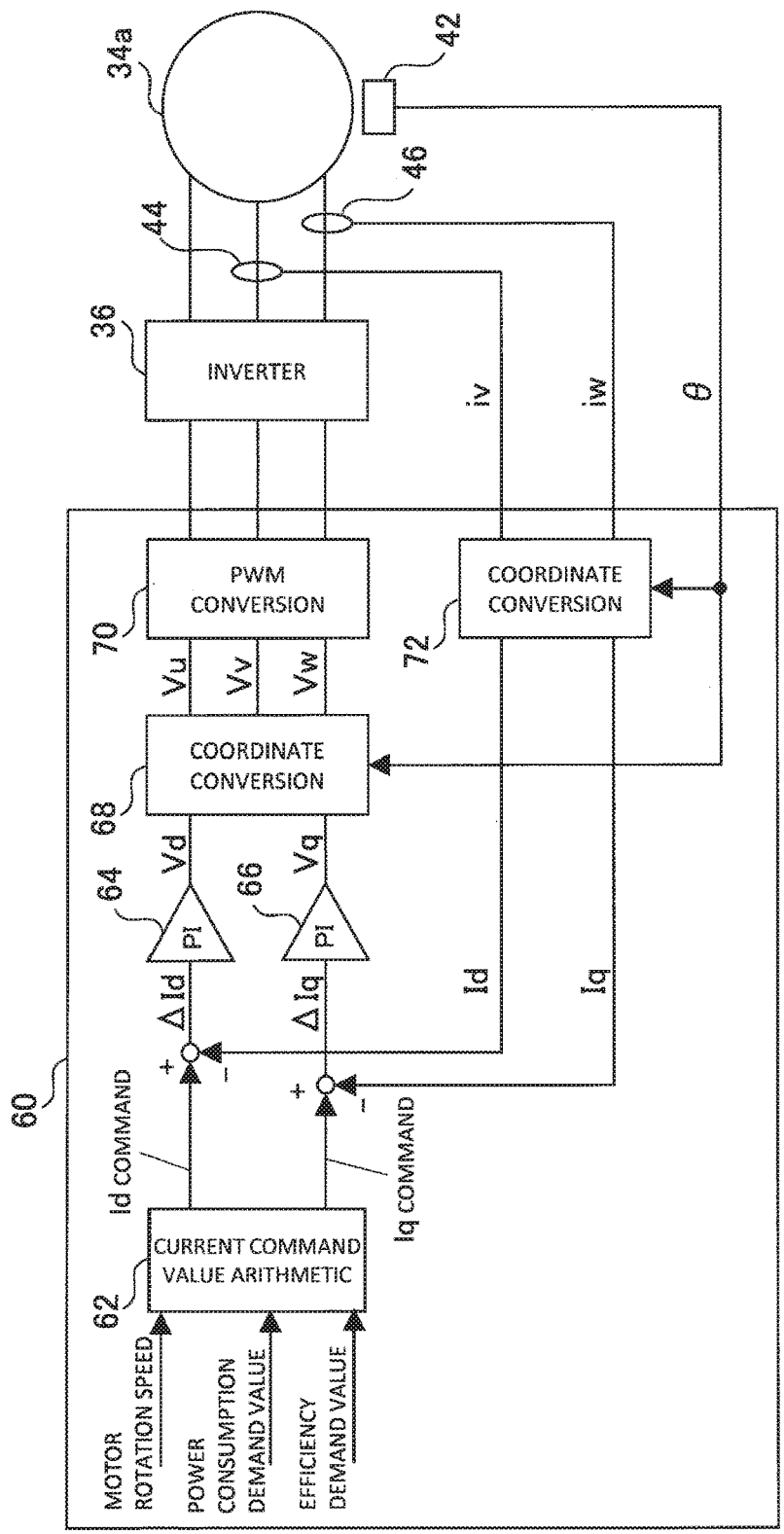
FIG. 2 is a view illustrating a configuration of an energization control apparatus.

As shown in FIG. 2, the energization control apparatus 60 controls the motor 34a via the inverter 36. A PWM control signal to control a switching element is supplied from the energization control apparatus 60 to the inverter 36. A rotation angle ($\theta$) of the motor 34a measured by an angle sensor 42 and current values (iv, iw) of the current flowing into the motor 34a measured by current sensors 44, 46 are fed back from the motor 34a to the energization control apparatus 60. The energization control apparatus 60 comprises a current command value arithmetic unit 62, a PI control unit 64 for a d-axis, a PI control unit 66 for a q-axis, a coordinate conversion unit 68, a PWM conversion unit 70 and a coordinate conversion unit 72 to produce a PWM control signal supplied to the inverter 36.

The current command value arithmetic unit 62 calculates command values of a two phase current that is a current flowing in the motor 34a indicated with d-q coordinates defined by a d-axis and a q-axis. The command values of the two phase current are a d-axis current command value (Id command) and a q-axis current command value (Iq command). The command values of the two phase current are calculated, for example by using a map prepared beforehand, with a rotation speed of the motor 34a, a demand value of electric power consumption, a demand value of efficiency, and the like.

A difference ($\Delta$Id) between the d-axis current command value (Id command) and a d-axis feedback current value (Id) is input into the PI control unit 64. The PI control unit 64 outputs a d-axis voltage command value (Vd) calculated based on proportional operation and integral operation. In the similar way, a difference ($\Delta$Iq) between the q-axis current command value (Iq command) and a q-axis feedback current value (Iq) is input into the PI control unit 66. The PI control unit 66 outputs a q-axis voltage command value (Vq) calculated based on proportional operation and integral operation.

The coordinate conversion unit 68 converts voltage command values (Vd, Vq) on the d-q coordinates into voltage command values (Vu, Vv, Vw) on three phase coordinates namely u-v-w coordinates. In this conversion, the rotation angle ($\theta$) of the motor 34a measured by the angle sensor 42 is referred to. The PWM conversion unit 70 converts the voltage command values (Vu, Vv, Vw) on the three phase coordinates into the PWM control signal, and supplies the PWM control signal to the inverter 36.

The coordinate conversion unit 72 acquires the current values (iv, iw) measured by the current sensors 44, 46, and converts them into the feedback current values (Id, Iq) on the d-q coordinates. In this conversion, the rotation angle (θ) of the motor 34a measured by the angle sensor 42 is referred to.

According to the energization control apparatus 60 with the above configuration, conversion efficiency to motor torque from the electric power to be supplied to the motor 34a can be controlled with the command values of the two phase current calculated in the current command value arithmetic unit 62. Specifically, the conversion efficiency can be controlled with a current phase angle that is a phase angle between the q-axis and the direction of a current vector consisting of the d-axis current command value (Id command) and the q-axis current command value (Iq command).

Figure 3:
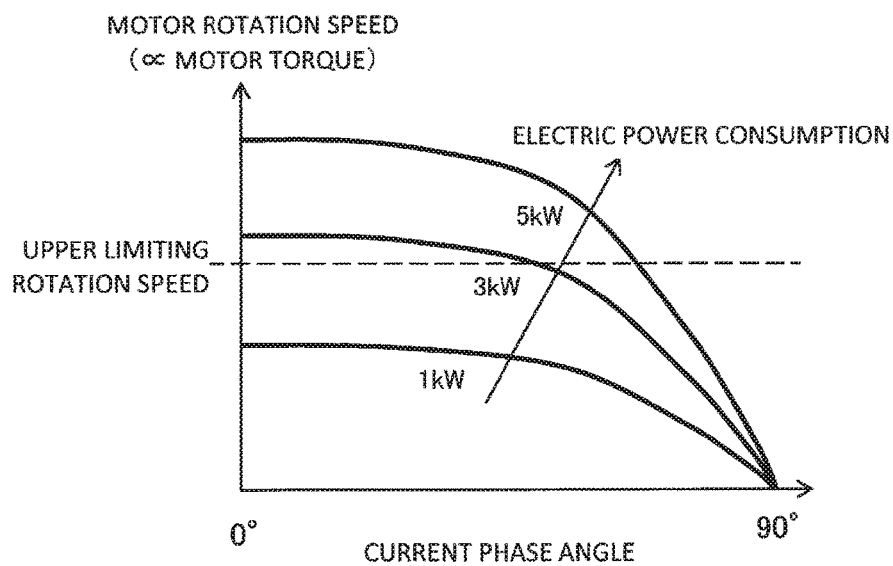
FIG. 3 is a view illustrating a relation between a current phase angle, a rotation speed and electric power consumption of a motor.

FIG. 3 is a view illustrating a relation between the current phase angle, the rotation speed and the electric power consumption of the motor 34a. The rotation speed of the motor 34a is generally proportional to the motor torque of the motor 34a. Thus, in the example shown in FIG. 3, the ratio of the motor torque to the electric power consumption, that is, the conversion efficiency from the electric power to the motor torque improves as the current phase angle approaches zero-degree angle. On the contrary, the conversion efficiency from the electric power to the motor torque deteriorates as the current phase angle approaches 90-degree angle.

In the normal operation of the electric compressor 34, the energization control apparatus 60 controls the energization to the electric compressor 34 so as to rotate the electric compressor 34 to promote supercharging by the electric compressor 34. This control mode is called a supercharging mode. In the supercharging mode, the energization control apparatus 60 generates the command values of the two phase current so that the conversion efficiency from the electric power to the motor torque becomes maximum. That is, the energization control apparatus 60 generates the command values of the two phase current so that the current phase angle approaches zero-degree angle.

As another control mode of the electric compressor 34, an electric power consumption mode is prepared in addition to the supercharging mode. The electric power consumption mode is a control mode using the electric compressor 34 not for the supercharging that is the original application of the electric compressor 34 but for intentional electric power consumption. In the electric power consumption mode, the energization to the electric compressor 34 is controlled so as to promote the electric power consumption of the electric compressor 34 while suppressing the rotation of the electric compressor 34. Specifically, in the electric power consumption mode, the energization control apparatus 60 generates the command values of the two phase current so that the conversion efficiency from the electric power to the motor torque deteriorates. That is, the energization control apparatus 60 generates the command values of the two phase current so that the current phase angle approaches 90-degree angle. Because of deterioration of the conversion efficiency from the electric power to the motor torque, the rotation speed of the electric compressor 34 does not rise and is kept low. Thereby, the electric power supplied to the electric compressor 34 is transformed into heat and consumed. The rotation speed of the electric compressor 34 in the supercharging mode is thousands to tens of thousands of rounds per one minute. In contrast, the rotation speed of the electric compressor 34 in the electric power consumption mode is held to zero to hundreds of rounds per one minute. For example, if part of regenerated electric power cannot be accepted by the battery 6 when regenerative braking is performed by using the first motor generator 4, the energization control apparatus 60 selects the electric power consumption mode.

An upper limiting rotation speed at continuous operation is set to the rotation speed of the motor 34a beforehand. This is intended to prevent durable deterioration caused by abrasion of a bearing. In the supercharging mode, the electric power consumption is adjusted so as to keep the rotation speed of the motor 34a from exceeding the upper limiting rotation speed while maintaining the current phase angle at zero-degree angle or neighborhood thereof. In the electric power consumption mode, by making the current phase angle approach 90-degree angle, the electric power consumption increases while the rotation speed of the motor 34a is kept from exceeding the upper limiting rotation speed.

Figure 4:
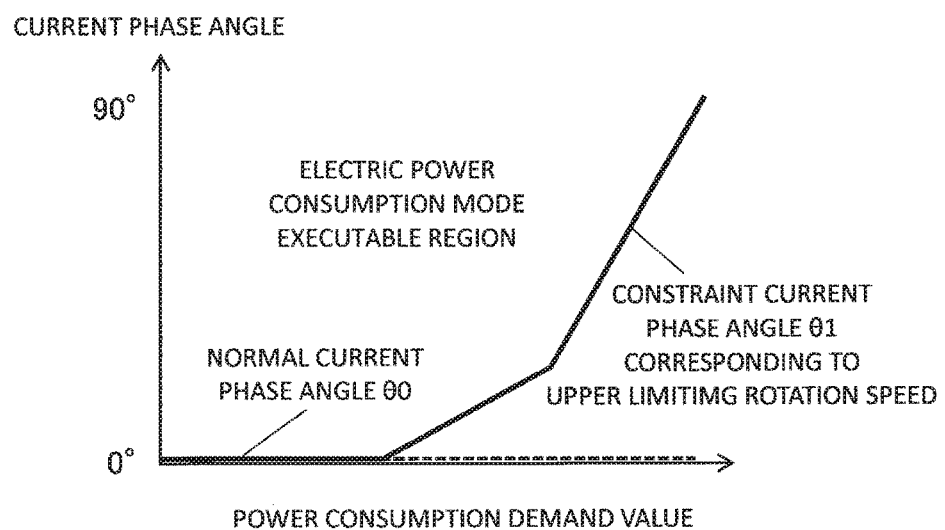
FIG. 4 is a view illustrating a setting of a current phase angle to a demand value of electric power consumption in an electric power consumption mode.

FIG. 4 is a view illustrating a setting of the current phase angle to the demand value of the electric power consumption in the electric power consumption mode. A normal current phase angle θ0 set in the supercharging mode and a constraint current phase angle θ1 corresponding to the upper limiting rotation speed are drawn in FIG. 4. The constraint current phase angle θ1 is a current phase angle of a lower limit of a range where the rotation speed of the motor 34a is kept from exceeding the upper limiting rotation speed, which depends on the demand value of the electric power consumption and the upper limiting rotation speed. In FIG. 4, a region of an advance side than the constraint current phase angle θ1 (side near 90-degree angle) is a region where operation with the electric power consumption mode is executable. A relation between the constraint current phase angle θ1 and the demand value of the electric power consumption is mapped, and stored in the memory of the control device 50.

Figure 5:
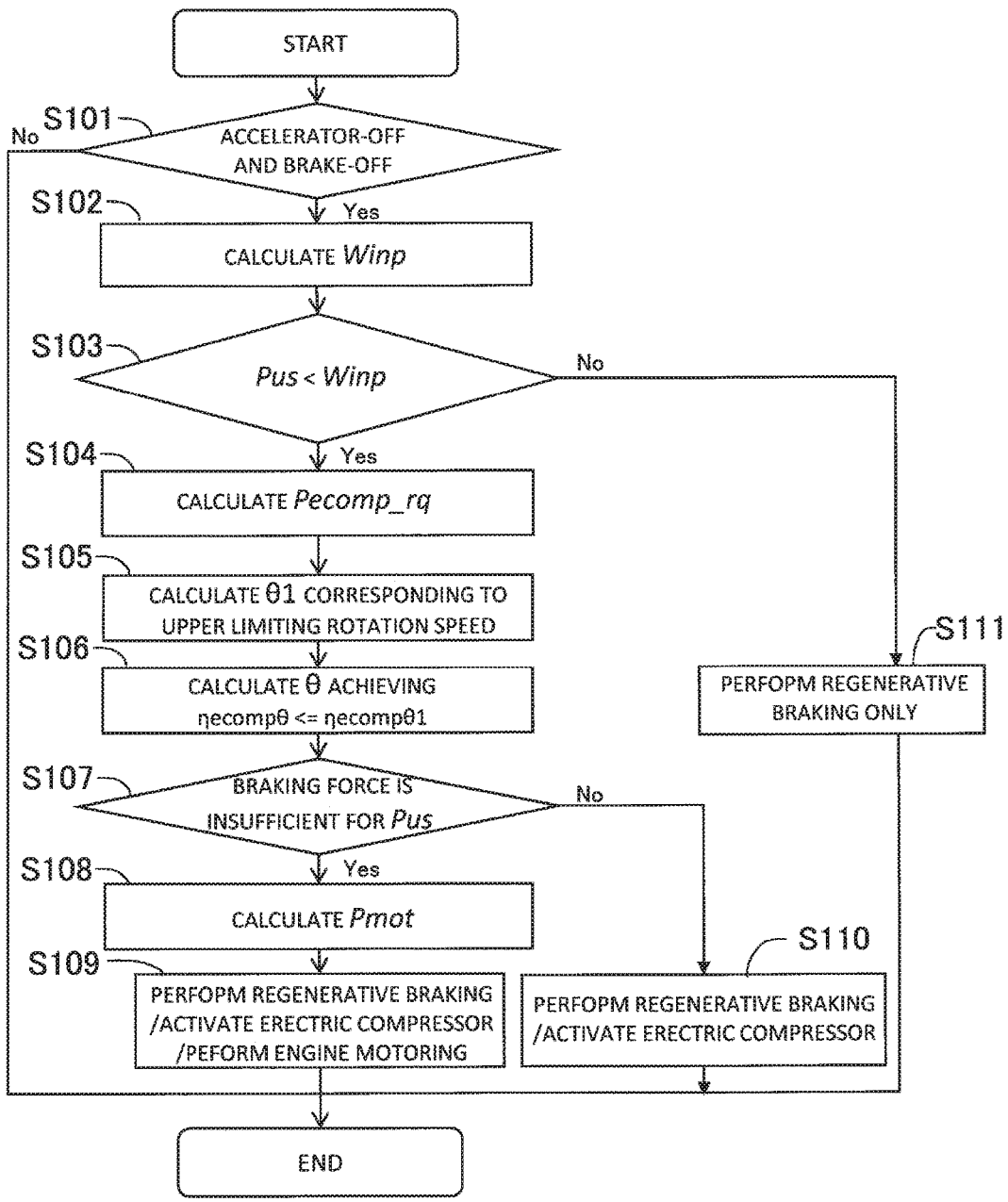
FIG. 5 is a flowchart illustrating procedure of an example of braking control.

As described above, the energization control of the electric compressor 34 according to the electric power consumption mode is used in the regenerative braking using the first motor generator 4. It is determined in braking control performed by the control device 50 whether to perform the regenerative braking during the braking of the hybrid vehicle 1 and whether to perform the electric power consumption mode then. FIG. 5 is a flowchart illustrating procedure of an example of the braking control performed by the control device 50. The processor of the control device 50 executes a program represented by this flow chart with a scheduled period. Hereinafter, contents of the example of the braking control will be described along the flow chart.

First, in step S101, it is confirmed whether the hybrid vehicle 1 is in a condition of accelerator-off and brake-off. The accelerator-off is a condition where an accelerator pedal is opened, and the brake-off is a condition where a brake pedal is opened. Each of the accelerator-off and the brake-off is detected by a switch. When the accelerator pedal is opened and the brake pedal is opened, the hybrid vehicle 1 performs coasting travel. At this time, as described below, the control device 50 performs at least one of the braking using motoring of the engine 2 (so-called engine brake) and the regenerative braking using the first motor generator 4 to reduce the running speed of the hybrid vehicle 1.

When the accelerator pedal is stepped on, neither the engine braking nor the regenerative braking is performed because the hybrid vehicle 1 is during acceleration or steady travel. When the brake pedal is stepped on, neither the engine braking nor the regenerative braking is performed because the hybrid vehicle 1 is braked mechanically by using a braking device. In these cases, all the subsequent processing is skipped, and the routine terminates.

When a determination result of step S101 is affirmative, arithmetic of step S102 is performed. In step S102, concerning an input limiting level Win of the battery 16, electric compressor operation determining value, which is a criterion to determine whether or not consumption of the regenerated electric power using the electric compressor 34 is necessary, is calculated. The input limiting level Win is calculated based on parameters of the battery 16, for example, a SOC, a current value, a voltage value, a temperature, and the like. Then, a value that is lower than the input limiting level Win by a predetermined margin is calculated as the electric compressor operation determining value Winp. Note that the code of the electric power inputted to the battery 16 is negative and the code of the electric power outputted from the battery 16 is positive. Thus, the code of the input limiting level Win is negative, and the absolute value of the electric compressor operation determining value Winp is larger than the absolute value of the input limiting level Win.

Next, a determination of step S103 is performed. In step S103, it is determined whether a demand braking force Pus is smaller than the electric compressor operation determining value Winp. The demand braking force Pus is braking force that an operator of the hybrid vehicle 1 demands and is calculated from, for example, vehicle speed and a shift position of a transmission, and the like. The code of the demand braking force Pus is negative. Thus, that "the demand braking force Pus is smaller than the electric compressor operation determining value Winp" means that "the magnitude of the demand braking force Pus is larger than the magnitude of the electric compressor operation determining value Winp.

When the determination result of step S103 is negative, processing of step S111 is performed. That "the determination result of step S103 is negative" means that "the braking force demanded by the operator does not have magnitude necessary for the consumption of the regenerated electric power using the electric compressor 34". Thus, in step S111, activating the regenerative braking using the first motor generator 4 is selected, while consuming the regenerated electric power by using the electric compressor 34 is not selected.

When the determination result of step S103 is affirmative, arithmetic of step S104, S105 and S106 is performed. In step S104, difference between the electric compressor operation determining value Winp and the demand braking force Pus is calculated as an electric power consumption demand value Pecomp_rq. The electric power consumption demand value Pecomp_rq is electric power consumption that is required to the electric compressor 34.

In step S105, the constraint current phase angle θ1 corresponding to the upper limiting rotation speed is calculated based on the electric power consumption demand value Pecomp_rq calculated in step S104. In step S106, the current phase angle θ in the electric power consumption mode is calculated based on the constraint current phase angle θ1 calculated in step S105. Here, when the efficiency of the electric compressor 34 implemented with the current phase angle θ is described as "ηecompθ", the efficiency of the electric compressor 34 implemented with the constraint current phase angle θ1 is described as "ηecompθ1", and the efficiency of the electric compressor 34 implemented with the normal current phase angle θ0 in the supercharging mode is described as "ηecompθ0", the following relation is established.

$$\eta ecomp\theta <= \eta ecomp\theta 1 < \eta ecomp\theta 0$$

Then, in step S107, it is determined whether or not insufficiency of the braking force for the demand braking force Pus occurs even when operating the electric compressor 34. By operating the electric compressor 34 with the electric power consumption mode, the regenerated electric power more than the input limiting level of the battery 16 can be consumed in the electric compressor 34. However, when the magnitude of the demand braking force Pus is very large, the regenerative braking force obtained by the first motor generator 4 might not be enough.

When the braking force is not sufficient even when the electric compressor 34 is operated, the braking using the motoring of the engine 2 is performed in conjunction with the regenerative braking using the first motor generator 4. In the motoring of engine 2, the braking three is generated by friction of the engine 2. Herein, the friction that is required to satisfy the demand braking force Pus is named "motoring friction demand value Pmot".

In step S108, the motoring friction demand value Pmot is calculated by using the following expression with the demand braking force Pus, the electric compressor operation determining value Winp, and the electric power consumption Pecomp of the motor 34a $$Pmot=-(Pus-Winp+Pecomp)$$

In step S109, the regenerative braking using the first motor generator 4 is performed so that the regenerative braking force becomes maximum. Then, excess of the regenerated electric power to the input limiting level of the battery 16 is supplied to the electric compressor 34, and the energization to the electric compressor 34 is controlled with the electric power consumption mode. Further, a parameter of the engine 2, for example, a throttle opening is adjusted based on the motoring friction demand value Pmot calculated in step S108, and the braking using the motoring of the engine 2 is performed.

When the determination result of step S107 is negative or when the braking force sufficient for the demand braking force Pus can be obtained by operating the electric compressor 34, processing of step S110 is performed. In step S110, the regenerative braking using the first motor generator 4 is performed so that the regenerative braking force appropriate to the demand braking force Pus is obtained. Then, excess of the regenerated electric power to the input limiting level of the battery 16 is supplied to the electric compressor 34, and the energization to the electric compressor 34 is controlled with the electric power consumption mode.

Figure 6:
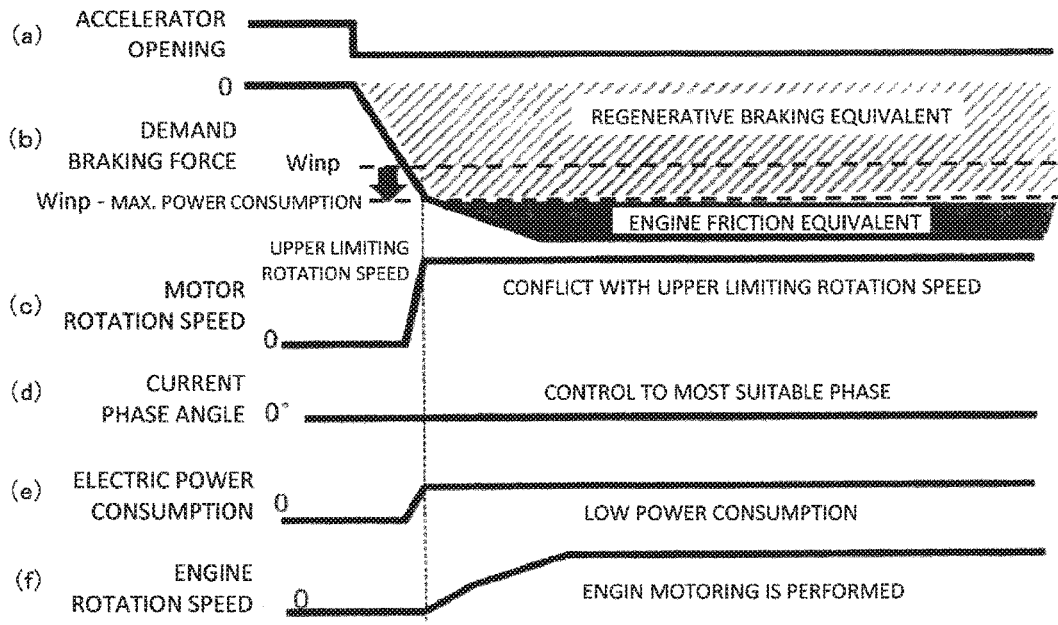
FIG. 6 is a timing chart illustrating operation of an electric compressor according to conventional braking control.
Figure 7:
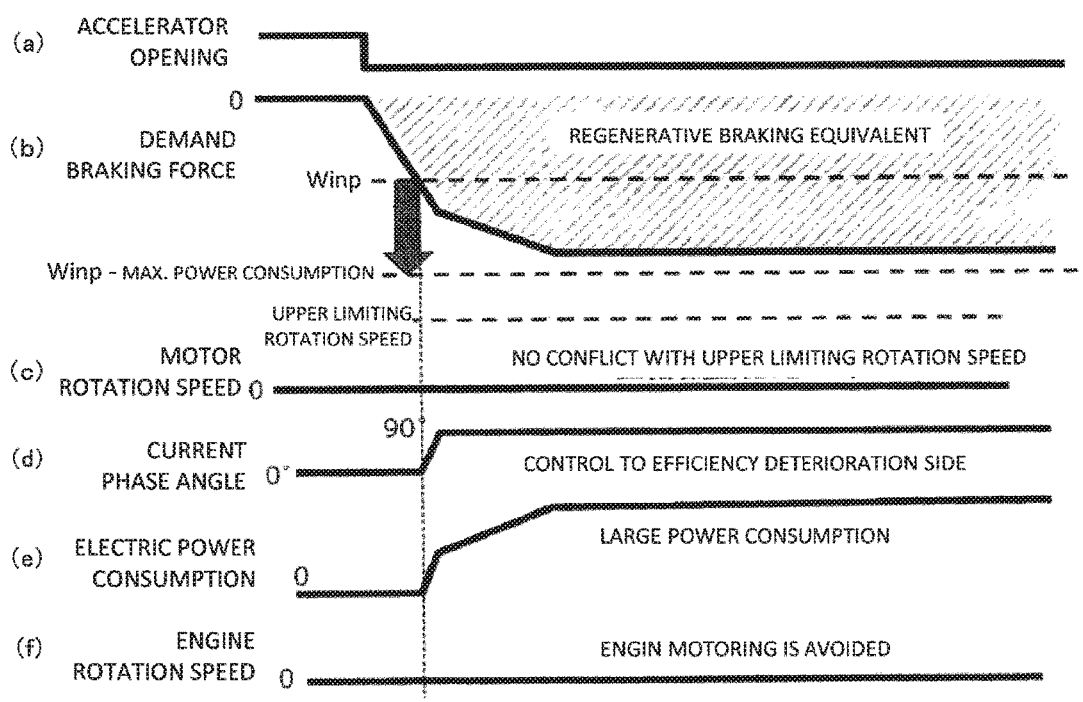
FIG. 7 is a timing chart illustrating operation of an electric compressor according to the braking control shown in FIG. 5.

Next, effects obtained by performing the above-described braking control (an example of the braking control) will be described by using FIGS. 6 and 7. FIG. 6 is a timing chart illustrating operation of the electric compressor according to braking control of a comparative example. In contrast, FIG. 7 is a timing chart illustrating operation of the electric compressor according to the above-described braking control. In the above-described braking control, the current phase angle is changed depending on the control mode. In contrast, in the comparative example, the current phase angle is always controlled to the most suitable phase angle (the phase angle that can maximize a torque, for example, zero-degree angle). In each time chart, changes with time in the following parameters are illustrated. The parameters are (a) accelerator opening, (b) demand braking force, (c) motor rotation speed, (d) current phase angle, (e) electric power consumption and (I) engine rotation speed.

First, the operation of the electric compressor 34a according to the braking control of the comparative example shown in FIG. 6 is described. In the case of the braking control of the comparative example, the demand braking force Pus is generated when the accelerator opening is turned off. When the demand braking force Pus exceeds the electric compressor operation determining value Winp, the motor rotation speed is raised while the current phase angle is maintained at the most suitable phase angle, so as to enlarge the electric power consumption of the electric compressor. However, the electric power consumption cannot be greatly enlarged because the motor rotation speed is limited by the upper limiting rotation speed. The sum of the electric compressor operation determining value Winp and the maximum electric power consumption of the electric compressor 34 is the regenerative braking force obtained in the electric power regeneration using the first motor generator 4. When the regenerative braking force is not sufficient for the demand braking force Pus, shortage thereof is made up for by the braking force obtained by the motoring of the engine 2. The rise of the engine rotation speed represents that the braking using the motoring is being performed.

Next, the operation of the electric compressor 34a according to the above-described braking control shown in FIG. 7 is described. In the case of the above-described braking control, the demand braking force Pus is generated when the accelerator opening is turned off. When the demand braking force Pus exceeds the electric compressor operation determining value Winp, the current phase angle is controlled to an efficiency deterioration side (for example, 90-degree angle) so as to enlarge the electric power consumption of the electric compressor. As the current phase angle approaches 90-degree angle, the conversion efficiency from the electric power to the torque deteriorates, and the electric power consumption increases while the motor rotation speed is kept low. The sum of the electric compressor operation determining value Winp and the maximum electric power consumption of the electric compressor 34 is the regenerative braking force obtained in the electric power regeneration using the first motor generator 4. According to the above-mentioned braking control, the regenerative braking force is sufficient for the demand braking force Pus, so performing the braking using the motoring of the engine 2 is avoided.

Now, when the rotation speed of motor 34a is excessively low, heavy-current continues flowing into a particular switching element of the inverter 36, and thereby the inverter 36 might be overheated and damaged. Thus, when the rotation speed of the motor 34a is low, the energization to the electric compressor 34 may be controlled to raise the rotation speed. Hereafter, control to prevent an excessive drop of the motor rotation speed will be described as the other example of the braking control performed by the energization control apparatus 60.

Figure 8:
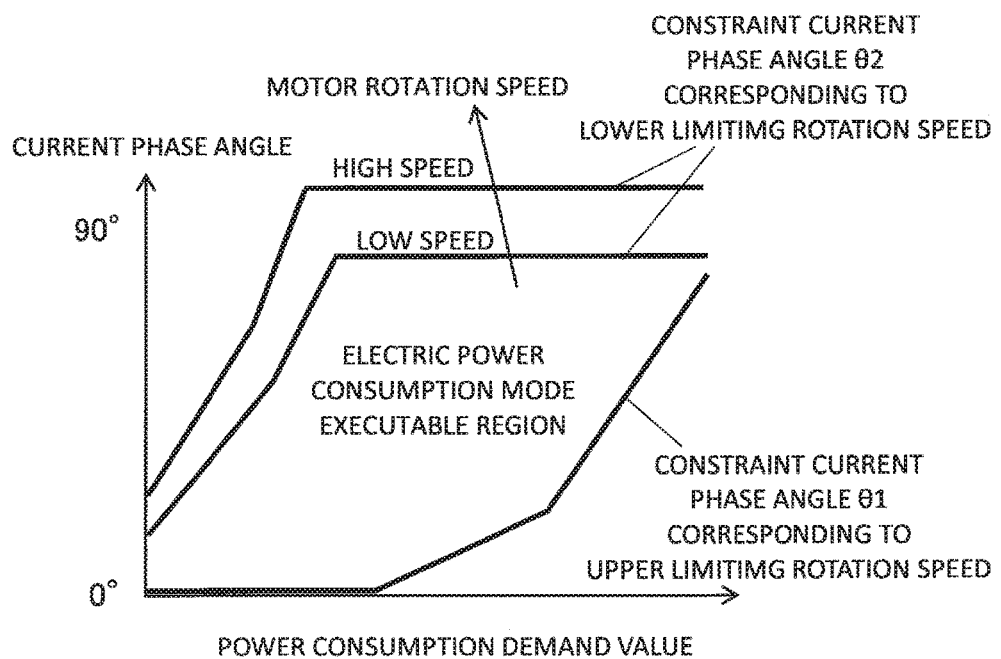
FIG. 8 is a view illustrating a setting of a current phase angle to a demand value of electric power consumption according to the other example of the braking control.

Raising the rotation speed of the motor 34a can be achieved by making the current phase angle small to improve the conversion efficiency from electric power to torque. Specifically, the command values of the two phase current may be generated so that the current phase angle does not exceed an upper limit angle. FIG. 8 is a view illustrating a setting of the current phase angle to the demand value of the electric power consumption according to the other example of the braking control. The normal current phase angle $\theta 0$ set in the supercharging mode, the constraint current phase angle $\theta 1$ corresponding to the upper limiting rotation speed, and a constraint current phase angle $\theta 2$ corresponding to a lower limiting rotation speed are drawn in FIG. 8. The constraint current phase angle $\theta 2$ is a current phase angle of an upper limit of a range where the rotation speed of the motor 34a is kept from falling below the lower limiting rotation speed, which depends on the demand value of the electric power consumption and the rotation speed of the motor 34a. The constraint current phase angle $\theta 2$ is set to a smaller value, that is, a more efficient value close to zero-degree angle, as the rotation speed of the motor 34a is low. In FIG. 8, a region from the constraint current phase angle $\theta 1$ (side near 90-degree angle) to the constraint current phase angle $\theta 2$ (side near zero-degree angle) is a region where operation by the electric power consumption mode is executable. In the other example of the braking control, a relation between the constraint current phase angle $\theta 1$, the constraint current phase angle $\theta 2$ and the demand value of the electric power consumption is mapped, and stored in the memory of the control device 50.

Figure 9:
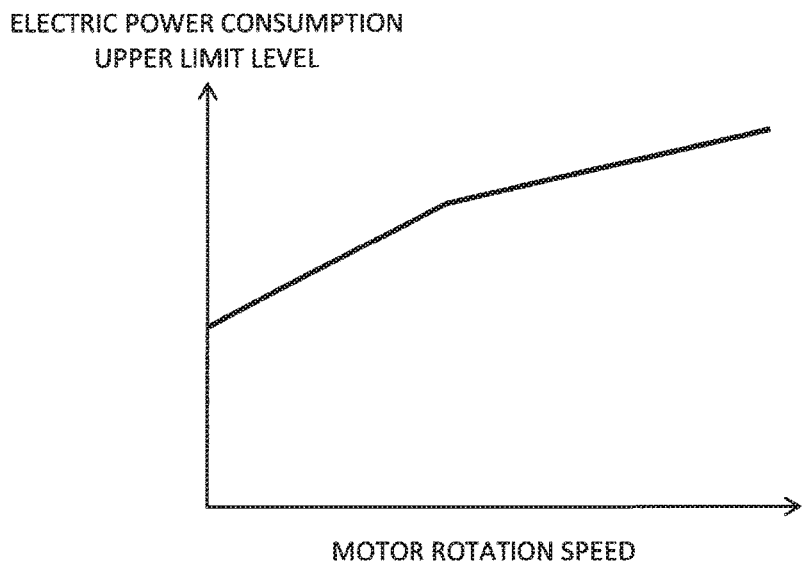
FIG. 9 is a view illustrating a setting of an upper limit level of electric power consumption to a rotation speed of a motor according to the other example of the braking control.

Further, in the other example of the braking control, the upper limit level of the electric power consumption of the electric compressor 34 is set according to the rotation speed of the motor 34a as shown in FIG. 9. Specifically, the upper limit level of the electric power consumption is reduced as the rotation speed of the motor 34a is low. When the rotation speed of the motor 34a is low, the time period when current flows into a particular switching element of the inverter 36 becomes long. However, by decreasing the upper limit level of the electric power consumption, the amount of current flowing into the particular switching element is suppressed, and damage of the inverter 36 is prevented.

Figure 10:
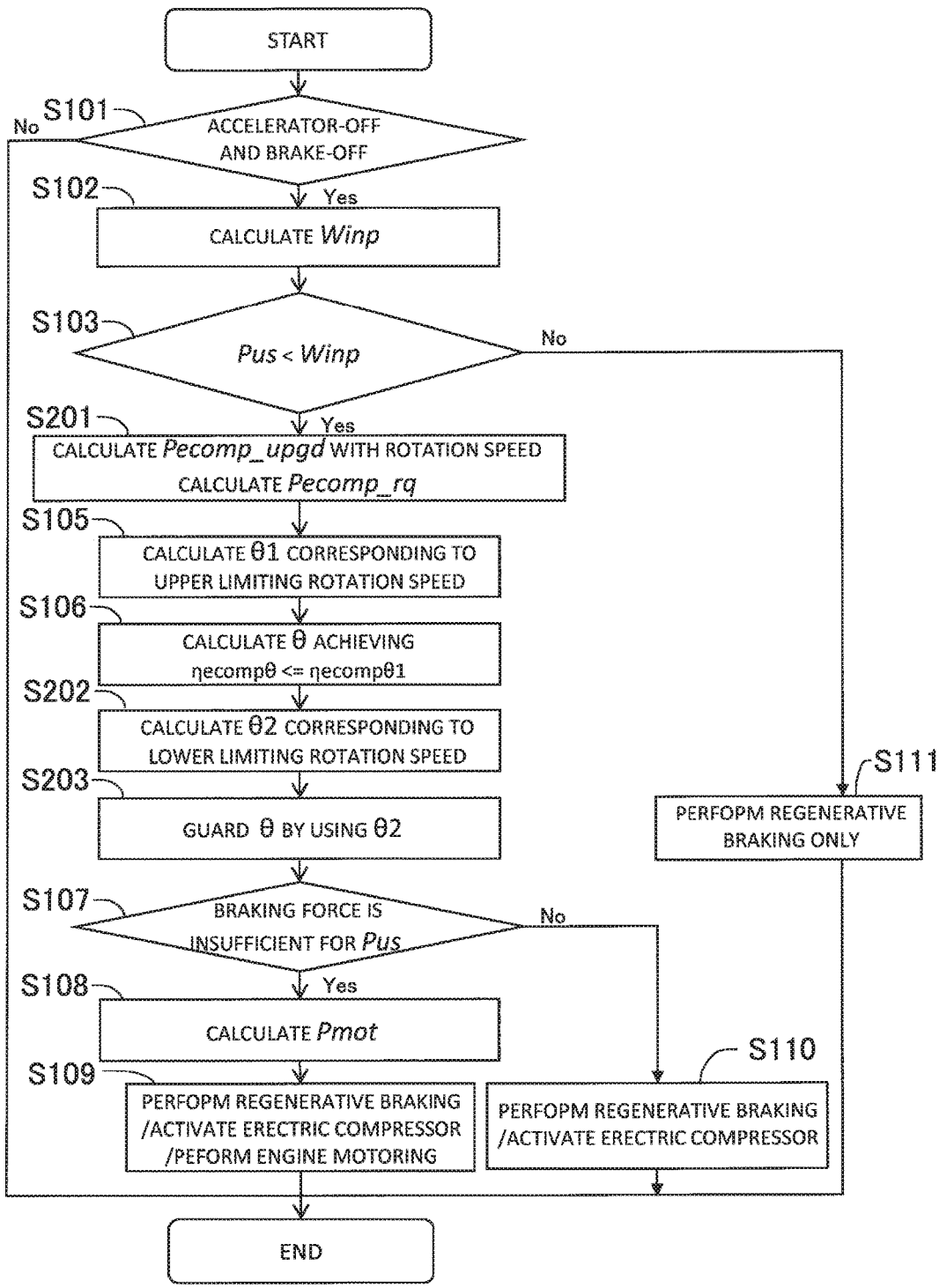
FIG. 10 is a flowchart illustrating procedure of the other example of the braking control.

FIG. 10 is a flowchart illustrating procedure of the other example of the braking control performed by the control device 50. When the other example of the braking control is performed, the processor of the control device 50 executes a program represented by this flow chart with a scheduled period. Hereinafter, contents of the other example of the braking control will be described along the flow chart. However, the explanation on the subject matters common to the example of the braking control described earlier is omitted.

In the other example of the braking control, when the determination result of step S103 is affirmative, arithmetic of step S201 is performed instead of arithmetic of step S104, and furthermore, arithmetic of step S105, S106, S202 and S203 is performed. In step S201, a power consumption upper limit Pecomp_upgd is calculated by using a map or a function with the rotation speed of the motor 34a. Then, difference between the electric compressor operation determining value Winp and the demand braking force Pus is compared with the power consumption upper limit Pecomp_upgd, and the smaller one of the two values is used as the electric power consumption demand value Pecomp_rq.

In step S202, the constraint current phase angle $\theta 2$ corresponding to the lower limiting rotation speed is calculated based on the electric power consumption of the electric compressor 34 and the rotation speed of the motor 34a. In step S203, the constraint current phase angle $\theta 2$ calculated in step S202 is used as a guard to the current phase angle $\theta$ calculated in step S106. That is, when the current phase angle $\theta$ calculated in step S106 is equal to or less than the constraint current phase angle $\theta 2$, the current phase angle $\theta$ calculated in step S106 is just used as the current phase angle $\theta$ in the electric current consumption mode. However, when the current phase angle $\theta$ calculated in step S106 is more than the constraint current phase angle $\theta 2$, the constraint current phase angle $\theta 2$ is used as the current phase angle $\theta$ in the electric current consumption mode. Here, when the efficiency of the electric compressor 34 implemented with the current phase angle $\theta$ is described as "$\eta ecomp\theta$", and the efficiency of the electric compressor 34 implemented with the constraint current phase angle θ2 is described as "ηcompθ2", the following relation is established.

$$\eta_{comp\theta 2} <= \eta_{comp\theta}$$

Figure 11:
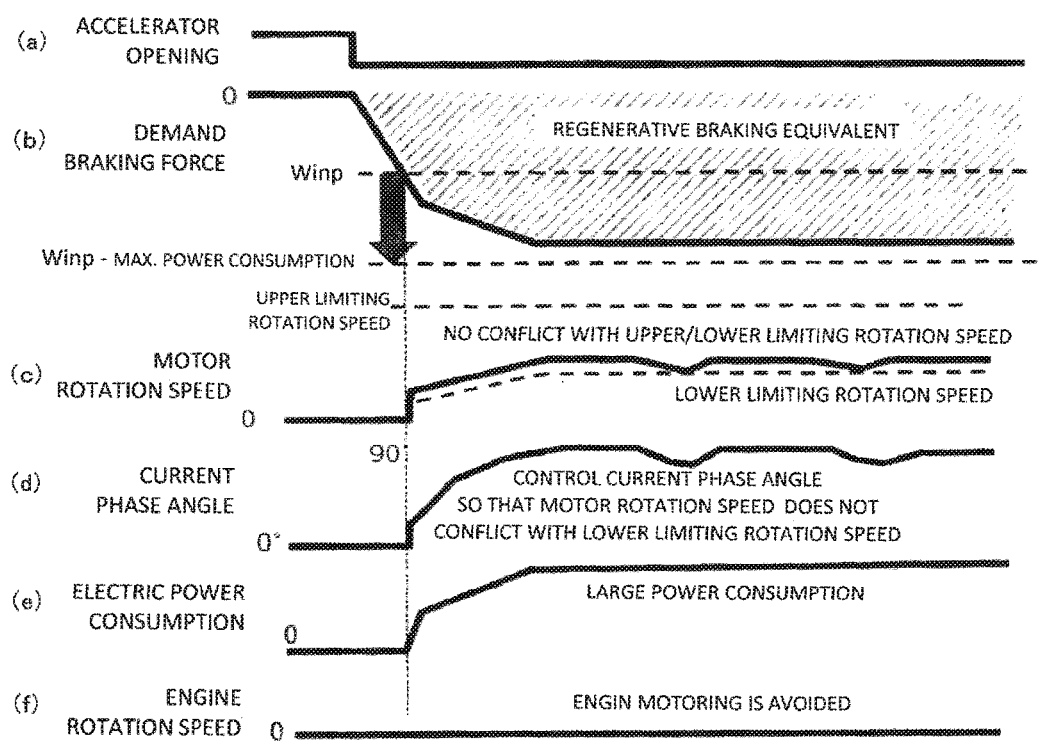
FIG. 11 is a timing chart illustrating operation of an electric compressor according to the braking control shown in FIG. 10.

FIG. 11 is a timing chart illustrating operation of the electric compressor according to the braking control shown in FIG. 10 (the other example of the braking control). In the time chart, changes with time in the following parameters are illustrated. The parameters are (a) accelerator opening, (b) demand braking force, (c) motor rotation speed, (d) current phase angle, (e) electric power consumption and (f) engine rotation speed. In the other example of braking control, the current phase angle is controlled so that the motor rotation speed does not conflict with the lower limiting rotation speed. Thereby, the rotation speed of the motor is kept from exceeding the upper limiting rotation speed in the continuous operation and is kept from falling below the lower limiting rotation speed for preventing damage of the inverter.

The above-described embodiment exemplifies a hybrid vehicle that comprises two motor generators and operates one as a generator and the other as a motor. However, the present disclosure can also be applied to a hybrid vehicle configured to operate a single motor generator as both a motor and a generator.

Also, in the above-described embodiment, electric power to operate the electric compressor 34 is supplied from the battery 16 for traveling. However, electric power may be supplied to the electric compressor 34 from a battery (not shown) for accessories.

Further, in the above-described embodiment, the command values of the two phase current are generated so that the current phase angle approaches 90-degree angle in the electric power consumption mode. However, generating the command values of the two phase current so that the current phase angle approaches −90-degree angle or 270-degree angle is available for a method for deteriorating efficiency of the motor 34a.

What is claimed is:

1. A hybrid vehicle comprising:
   an internal combustion engine that is coupled to a wheel via a power transmission system;
   an electric compressor that is provided on an intake passage of the internal combustion engine and is driven by a motor;
   a generator that is coupled to the wheel via the power transmission system and is capable of inputting regenerative braking force obtained by electric power regeneration to the power transmission system;
   a battery that stores electric power regenerated by the generator; and
   an energization control apparatus that controls energization to the electric compressor,
   wherein the energization control apparatus is configured to be capable of selecting a supercharging mode in which the energization control apparatus controls the energization to the electric compressor so as to rotate the electric compressor to supercharge an intake air and an electric power consumption mode in which the energization control apparatus controls the energization to the electric compressor so as to deteriorate efficiency of the motor than the supercharging mode to increase electric power consumption of the electric compressor, and
   wherein the energization control apparatus is configured to supply regenerated electric power to the electric compressor and control the energization to the electric compressor with the electric power consumption mode when regenerative braking is performed with the generator and the regenerated electric power for obtaining demand regenerative braking force is more than an input limiting level of the battery.

2. The hybrid vehicle according to claim 1,
   wherein the electric compressor comprises an inverter that converts DC electric power into AC electric power and supplies it to the motor,
   wherein the energization control apparatus is configured to generate command values of a two phase current that is a current flowing in the motor indicated with d-q coordinates defined by a d-axis and a q-axis, and determine a control signal to be supplied to the inverter based on the command values of the two phase current, and
   wherein the energization control apparatus in the electric power consumption mode generates the command values of the two phase current so as to bring a current phase angle on the d-q coordinates close to a 90-degree angle than a current phase angle in the supercharging mode.

3. The hybrid vehicle according to claim 2,
   wherein the energization control apparatus in the electric power consumption mode sets a lower limit angle of the current phase angle based on a demand level of the electric power consumption of the electric compressor and a predetermined upper rotation speed of the motor, and generates the command values of the two phase current so as to keep the current phase angle within a range from the lower limit angle to the 90-degree angle.

4. The hybrid vehicle according to claim 3,
   wherein the energization control apparatus in the electric power consumption mode sets an upper limit angle of the current phase angle based on the demand level of the electric power consumption of the electric compressor and a rotation speed of the motor, decreases the upper limit angle of the current phase angle as the rotation speed of the motor is low, and generates the command values of the two phase current so as to keep the current phase angle within a range from the lower limit angle to the upper limit angle.

5. The hybrid vehicle according to claim 2,
   wherein the energization control apparatus in the electric power consumption mode sets an upper limit level of the electric power consumption of the electric compressor according to a rotation speed of the motor, and decreases the upper limit level of the electric power consumption as the rotation speed of the motor is low.

* * * * *